M. SIMONS.
Coffee and Tea Pot.
No. 90,030. Patented May 11, 1869.
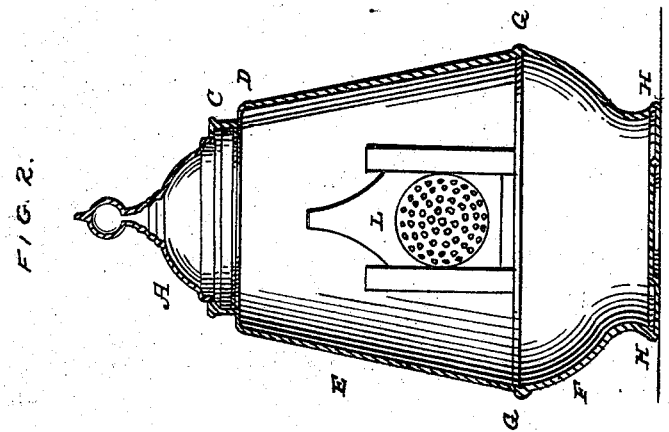
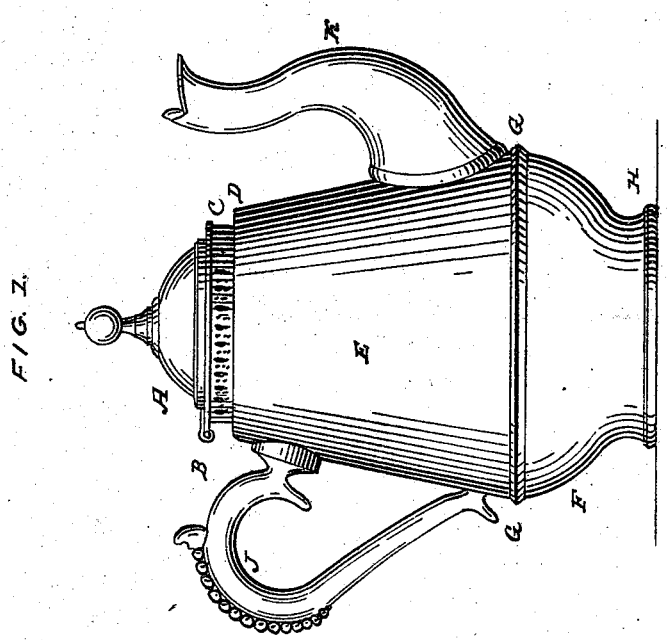
WITNESSES:
INVENTOR.

MICHAEL SIMONS, OF MIDDLETOWN, CONNECTICUT.

Letters Patent No. 90,030, dated May 11, 1869.

IMPROVEMENT IN COFFEE AND TEAPOT.

The Schedule referred to in these Letters Patent and making part of the same.

*To all whom it may concern:*

Be it known that I, MICHAEL SIMONS, of Middletown, Middlesex county, State of Connecticut, have invented an Improved Coffee and Teapot; and I do hereby declare the following to be an exact description thereof, reference being had to the accompanying drawings, and to the letters of reference marked thereon, making a part of this specification, in which—

Figure 1 represents a perspective view of the coffee or teapot, and

Figure 2, a vertical section of the same.

The nature of my invention consists in a spun, or dished bottom, made of Britannia-ware, or any soft metal, attached permanently to a tin top; also, the spun top for the ring of the lid to rest upon.

The object is to manufacture a coffee-pot, or teapot, cheaper in price than when made wholly of Britannia ware, and to wear longer than a tin one, whilst its advantages are, that it is free from rust, and will not rust near the bottom, like tin, and can always be made of much neater shapes than when made of tin only.

Thus, by the combination of the tin and Britannia ware, the neatest and cheapest kind of coffee-pots, or teapots can be made.

A represents the lid, operating on a hinge, B, and a metallic ring, C, that rests upon the spun, or turned-in flange D of the top part of the tin body E of the coffee-pot.

The lower part of the tin body E is grooved, so that the top edge of the dished bottom F, of Britannia ware, fits on the inside of the groove G, and forms a tight joint, to be soldered securely.

H is the base of the Britannia bottom F.

J represents the handle;

K, the spout; and

L, the convex strainer.

Therefore,

What I claim as new, and desire to secure by Letters Patent, is—

A spun, or dished bottom, F, made of Britannia-ware, when attached permanently to a tin top, E, as herein described, and for the purpose set forth.

MICHAEL SIMONS.

Witnesses:
   J. FRANKLIN REIGART,
   EDM. F. BROWN.